(12) United States Patent
Cohen et al.

(10) Patent No.: US 7,343,390 B2
(45) Date of Patent: Mar. 11, 2008

(54) SYSTEMS AND METHODS FOR CONDUCTING INTERNET CONTENT USAGE EXPERIMENTS

(75) Inventors: Jules S. Cohen, Seattle, WA (US); Paul K. Kromann, Redmond, WA (US); Thomas S. Reeve, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1270 days.

(21) Appl. No.: 09/741,362

(22) Filed: Dec. 20, 2000

(65) Prior Publication Data

US 2002/0078141 A1  Jun. 20, 2002

(51) Int. Cl.
*G06F 15/16* (2006.01)
(52) U.S. Cl. .............. 709/203; 717/168; 717/174; 715/744; 715/745
(58) Field of Classification Search .......... 709/246, 709/208, 203–205, 206, 217–219, 229, 223–226; 717/168, 174; 715/744, 745
See application file for complete search history.

(56) References Cited

U.S. PATENT DOCUMENTS

| | | | | |
|---|---|---|---|---|
| 6,006,265 A | * | 12/1999 | Rangan et al. | 709/226 |
| 6,421,733 B1 | * | 7/2002 | Tso et al. | 709/246 |
| 6,430,563 B1 | * | 8/2002 | Fritz et al. | 707/10 |
| 6,438,575 B1 | * | 8/2002 | Khan et al. | 709/200 |
| 6,460,036 B1 | * | 10/2002 | Herz | 707/10 |
| 6,496,885 B1 | * | 12/2002 | Smart et al. | 710/100 |
| 6,697,948 B1 | * | 2/2004 | Rabin et al. | 713/200 |
| 6,801,929 B1 | * | 10/2004 | Donoho et al. | 709/204 |
| 6,839,680 B1 | * | 1/2005 | Liu et al. | 705/10 |

* cited by examiner

*Primary Examiner*—Nathan Flynn
*Assistant Examiner*—Mohammad Siddiqi
(74) *Attorney, Agent, or Firm*—Woodcock Washburn LLP

(57) ABSTRACT

A system and method for efficiently executing a plurality of live parallel Internet content usage experiments using a large pool of randomly selected participating users (separated into control and test groups) while minimally disturbing offered content is provided. In an illustrative implementation, a content provider communicates the parameters for a content usage experiment to a content server. A complimentary test subject verification script operates on the content server that determines which client computing devices are to be included in the experiment group. In operation, a participating client computing device requests content from the content provider's server. The content provider's server executes the test subject verification script to determine if the client computing device is to be considered as a test subject. The content usage of the experiment content and non-experiment content is tracked and compared to each other to determine if the experiment content impacted content usage.

22 Claims, 9 Drawing Sheets

SYSTEMS AND METHODS FOR CONDUCTING INTERNET CONTENT USAGE EXPERIMENTS

FIELD OF THE INVENTION

The present invention relates to the field of content experiments. Particularly, the present invention is directed to the creation and analysis of a plurality of parallel content experiments, and more particularly, to systems and methods that for efficiently executing a plurality of live parallel content usage experiments using a large pool of randomly selected participating users while minimally disturbing offered content.

BRIEF DESCRIPTION OF PRIOR DEVELOPMENTS

The Internet has changed the face of information technologies and electronic communications. Today, people turn to the Internet to obtain a variety of information ranging from the latest news headlines to stock quotes. As the Internet has grown, so too, has the number of content providers offering Internet based content. Participating Internet users now have a myriad of choices when seeking particular content. As such, content providers are often cast in the role of "swami," trying to predict user preferences for content in an effort to increase market share and expand their target audience.

In an effort to better understand user content preference, content providers have developed and implemented a number of systems and methods to track content usage. The collected content usage information is subsequently analyzed to determine the efficacy of the offered content. As such, content usage information is a very important metric used by content providers to assess their content offerings. In the Internet realm, competing content providers rely on content usage data to determine which content is most effective (i.e. receives most attention) and most desirable to participating users.

A popular method of tracking content usage is to create test groups and offer differing content to different test groups. This method is usually performed in a controlled setting having test groups of 20 to 30 participating users. The method relies on an assumption that the tested sample is representative of an average participating user's content usage. In fact, groups of 20 to 30 participants is drastically smaller than the number of actual Internet users. As such, drastically irrelevant results may result. Further, this method requires content providers to expend extensive resources to recruit test groups, and, in some situations, to provide testing facilities and equipment. Also, this method disrupts the flow of content delivery. Given such costs, content providers tend to perform these experiments one at a time.

Internet content usage may also be tracked using automated content usage computing applications and scripts (e.g. Web Log Analyzer). For example, the Web log analyzer automates content usage tracking by cooperating with Web server content applications to maintain a list of accessed content, known as a Web log. The Web log analyzer parses the Web log using a number of criteria to create Web log reports. These reports generally indicate how many participating users accessed particular offered content. Although such information may be useful in ascertaining which content is popular among participating users, it provides little insight as to why such content was popular. In addition, it is difficult to ascertain how many unique participating users accessed particular offered content.

From the foregoing it can be appreciated that there exists a need for a system and methods that allow content providers the ability to efficiently execute a plurality of live Internet content usage experiments that randomly select subjects from all participating content users while minimally disturbing offered content. By having a system and methods that allow Internet content providers to easily implement live parallel Internet content usage tests, content providers are better positioned to determine the efficacy of offered content and draw meaningful inferences as to why certain content is more effective than other content.

SUMMARY OF THE INVENTION

The present invention is directed to a system and methods that allow Internet content providers to efficiently execute a plurality of live parallel Internet content usage experiments using a large pool of randomly selected participating users (separated into control and test groups) while minimally disturbing the flow of offered content. The system and methods provide an experiment harness that affords convenient and flexible control over experiment parameters (such as test group segregation) and a simple control API for implementing experiments within a content provider's server. The harness supports any kind of experiment that involves segregating users into a test group and a control group, each of which receives a different variation of content for the duration of the experiment. The results of the experiment (e.g. content usage logs) can be analyzed to compare the behavior of the test group to that the control group.

In an illustrative implementation, the invention comprises a server side object and a configuration file. Content providers populate configuration file parameters that define the scope of a given experiment. These parameters include, the name of the experiment, the duration of the experiment, a list of the Web sites that are to execute the experiment (e.g. MSN.COM alone or MSN.COM, CA.MSN.COM, etc), and hashing and range parameters used to select users for the experiment. The server side object (e.g. script or application) resides on the content provider's server and is called each time content is requested from the content provider's server by a participating user. The object is used to determine if the participating user is to be included as a member of test group for an experiment.

When content is requested by a participating user, the server side object performs a calculation to determine if the participating user is to be included in an experiment. The calculation uses a hashing algorithm that employs the hashing parameter provided in the configuration file in combination with an assigned unique identifier of the requesting participating party. This calculation produces an integer and a check is made to see if the integer falls within a range specified by any of the "Range" parameters of the experiment configuration files. If this check is positive, the user is included in the appropriate experiment. A check is then made to determine if the experiment is still live. If the experiment is still live, the participating user is subjected to experiment conditions and the participating user's behavior logged. To obtain general content usage information, logging occurs whether or not the user is part of the experiment.

Upon the lapse of the experiment, the results of the experiment are collected and analyzed. This can be accomplished by parsing participating users behavior logs to separate the logged behavior of the test group from a control group. A determination may then be made to see if the experiment conditions had any affect on participating user's behavior.

In an exemplary implementation, the parallel content experiment system and methods are employed in the MSN Web site to determine the efficacy of offered content in an effort to provider more relevant content.

DETAILED DESCRIPTION OF THE DRAWINGS

The system and methods that allow a plurality of live parallel Internet content experiments is further described with reference to the accompanying drawings in which.

DETAILED DESCRIPTION OF ILLUSTRATIVE EMBODIMENTS

Overview

Figure 1:
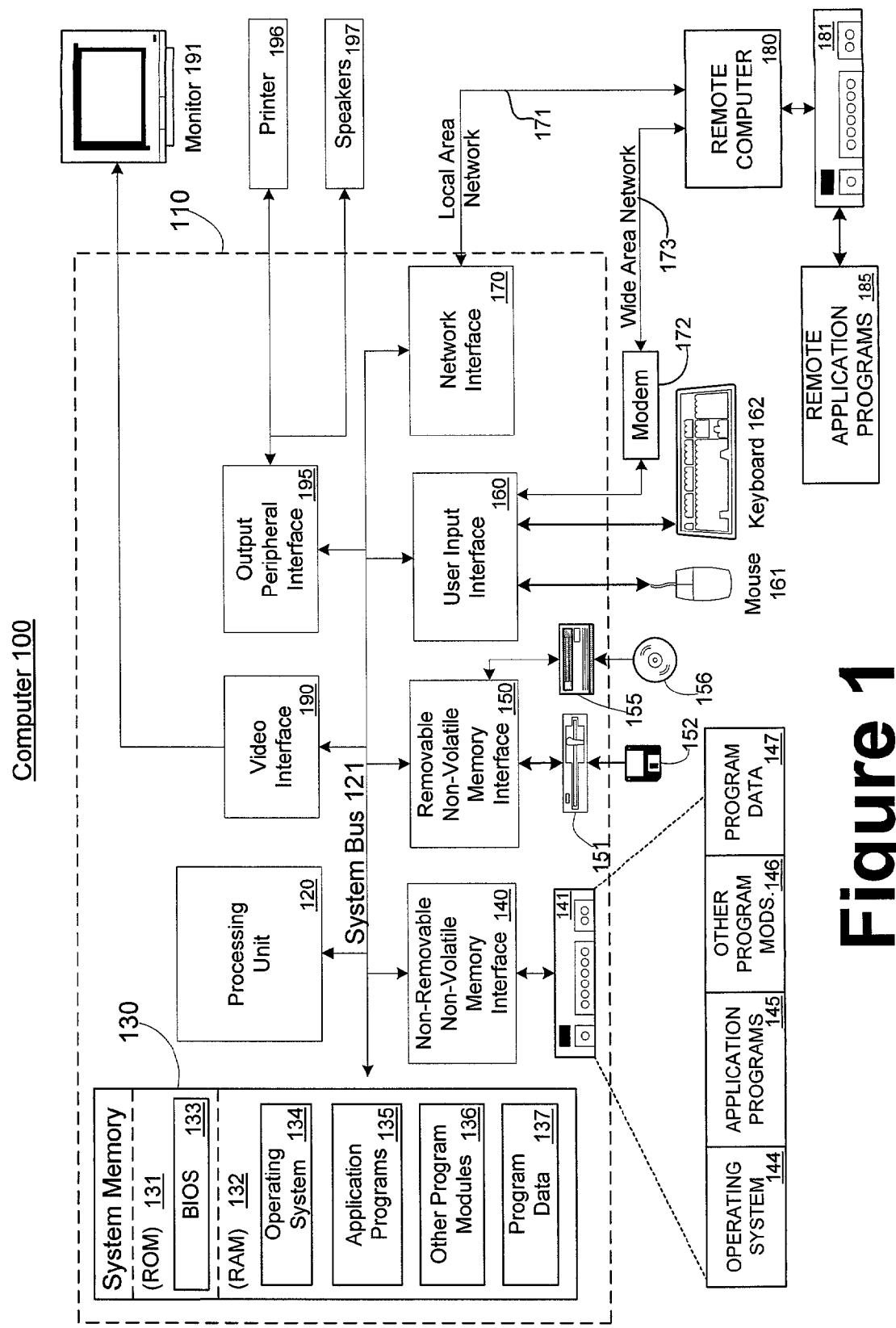
FIG. 1 is a block diagram representing an exemplary computing environment in accordance with the present invention.

The term "Internet" is an abbreviation for "Internetwork," and refers commonly to the collection of networks and gateways that utilize the TCP/IP suite of protocols, which are well-known in the art of computer networking. TCP/IP is an acronym for "Transmission Control Protocol/Internet Protocol," a software protocol developed by the Department of Defense for communication between computers. The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

Electronic information transferred between data-processing networks is usually presented in hypertext, a metaphor for presenting information in a manner in which text, images, sounds, and actions become linked together in a complex non-sequential web of associations that permit the user to "browse" or "navigate" through related topics, regardless of the presented order of the topics. These links are often established by both the author of a hypertext document and by the user, depending on the intent of the hypertext document. For example, traveling among links to the word "iron" in an article displayed within a graphical user interface in a data-processing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

The term "hypermedia," on the other hand, more recently introduced, is nearly synonymous with "hypertext" but focuses on the non-textual components of hypertext, such as animation, recorded sound, and video. Hypermedia is the integration of graphics, sound, video, or any combination thereof into a primarily associative system of information storage and retrieval. Hypermedia, as well as hypertext, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hypermedia, as well as hypertext topics, are thus linked in a manner that allows the user to jump from one subject to other related subjects during a search for information. Hyper-link information is contained within hypermedia and hypertext documents, which allow a user to move back to "original" or referring network sites by the mere "click" (i.e., with a mouse or other pointing device) of the hyper-linked topic.

A typical networked system that utilizes hypertext and hypermedia conventions follows a client/server architecture. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server).

A request by a user for news can be sent by a client application program to a server. A server is typically a remote computer system accessible over a remote network such as the Internet. The server scans and searches for raw (e.g., unprocessed) information sources (e.g., newswire feeds or newsgroups). Based upon such requests by the user, the server presents filtered electronic information as server responses to the client process. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by Hypertext-Transfer Protocol (HTTP) or the Wireless Application Protocol (WAP). The World Wide Web (WWW) or, simply, the "Web," includes those servers adhering to this standard (i.e., HTTP and WAP) which are accessible to clients via a computer or data-processing system network address such as a Universal Resource Locator (URL). The network address can be referred to as a Universal Resource Locator address. For example, communication can be provided over a communications medium. In particular, the client and server may be coupled to one another via Serial Line Internet Protocol (SLIP) or TCP/IP connections for high-capacity communication. Active within the client is a first process, known as a "browser," which establishes the connection with the server and presents information to the user. The server itself executes corresponding server software which presents information to the client in the form of HTTP responses. The HTTP responses correspond to "web pages" constructed from a Hypertext Markup Language (HTML), Hand-held Device Markup Language (HDML), Extensible Markup Language (XML), or other server-generated data. Each web page can also be referred to simply as a "page."

The client and server typically display browsers and other remote network data for a user via a graphical user interface. A graphical user interface is a type of display format that enables a user to choose commands, start programs, and see lists of files and other options by pointing to pictorial representations (icons) and lists of menu items on the screen. Choices can be activated generally either with a keyboard or a mouse. Internet services are typically accessed by specifying a unique network address (i.e., Universal Resource Locator). The Universal Resource Locator address has two basic components, the protocol to be used and the object pathname. For example, the Universal Resource Locator address, "http://www.uspto.gov" (i.e., home page for the U.S. Patent and Trademark Office), specifies a hypertext-transfer protocol ("http") and a pathname of the server ("www.uspto.gov"). The server name is associated with a unique numeric value (TCP/IP address).

The immense popularity of the Internet among participating users has driven Internet content providers to deliver more desirable and relevant content to retain existing users and attract new users. Typically, content providers rely on content usage logs to determine the efficacy of particular content. However, these logs provide little insight as to possibly why particular content may have been chosen. Accordingly, content providers have developed certain tests and experiments to better understand the impact of content on participating users. For example, content providers employ test labs that register test subjects, according to predetermined criteria (e.g. gender, age, income, etc.) to participate in controlled content usage experiments. In this scenario, a group of 25 to 100 test subjects may be offered the same content in differing formats. Their content usage is then tracked and analyzed to determine the most effective content format. However, this undertaking is cumbersome, costly, and provides suspect results. For these reasons, Internet content providers will perform one content usage experiment at a time yielding what amounts to be a lengthy content update cycle.

The present invention was developed to provide content providers the ability to create, manage, and execute a plurality of live content usage experiments that employ randomly selected subjects from a set of all participating content users and minimally disturb offered content. With this ability, content providers are given a tool to better understand in real time why particular content is being chosen. Such information may be used to develop more relevant content that is in tune with users' interests and proclivities.

In an illustrative implementation, the content usage experiment system may be realized as a computing application or computing elements employed by an Internet content service to execute a plurality of live content usage experiments. The computing application and computing elements may be employed and/or incorporated into existing Internet content such to provide experiment content to randomly selected test subjects and to compare the content usage of the experiment content by the test subjects to content usage of non-experiment content by non-test subjects. Using this comparison information, content providers are better situated to determine if the changes in the experiment content effected content usage (e.g. if the change in font of a particular headline link caused any change in the usage of the headline link).

The above scenario may be realized by the following. Experiment content may be created and stored in an Internet content provider's server. An experiment may then be defined for the created content through the population of experiment parameters. These parameters are processed by the content usage experiment system to create and execute the content usage experiment. These parameters may include the duration of the experiment, the Internet sites that will be part of the experiment (i.e. an Internet service may have more than one site associated with it—e.g. MSN.COM may have MSN.COM, MSN.CO.JP, MSN.CO.UK, etc.), and the range of the test subjects. Upon the request of content by a participating user, the participating user is processed by content usage experiment system to determine if he/she is within the range of test subjects to receive experiment content for any of the created experiments. If the user qualifies as a test subject, a further check is performed to ensure that the experiment for which he/she has qualified is still active. If active, the qualified participating user is offered experiment content from the experiment for which he/she has qualified. The user's content usage is tracked and logged for future analysis. In an effort to obtain content usage information, the user's content usage is tracked whether or not they are part of the group participating in the experiment. By having experiment content usage and general content usage a determination of the efficacy of the experiment content may be made. Once the experiment duration has elapsed the content usage for the experiment is analyzed to determine the efficacy of the experiment content.

As will be described below with respect to FIGS. 1-8, the present invention is directed to a system and methods that allow content providers to efficiently execute a plurality of live Internet content usage experiments. In accordance with an illustrative implementation thereof, the present invention comprises a system and method to provide Internet content providers with a computing application and computing elements to realize these experiments.

In one embodiment, described more fully hereinafter, the methods and system of the present invention may be implemented as part of a computer network such as the Internet having a plurality of server computers representing Internet content providers hosting content, such as Internet domains. Further, a plurality of users (i.e. client computers) are connected to the computer network through computer hardware and software (i.e. Web browsers) such that the user may request, transmit, and receive Internet content. Although the depicted embodiment provides an Internet based computing application to execute a plurality of live Internet content usage experiments, those skilled in the art will appreciate that the inventive concepts described herein extend to a variety computing systems having a variety of configurations executing content usage experiments.

Illustrative Computing Environment

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Illustrative Computer Network Environment

Figure 2:
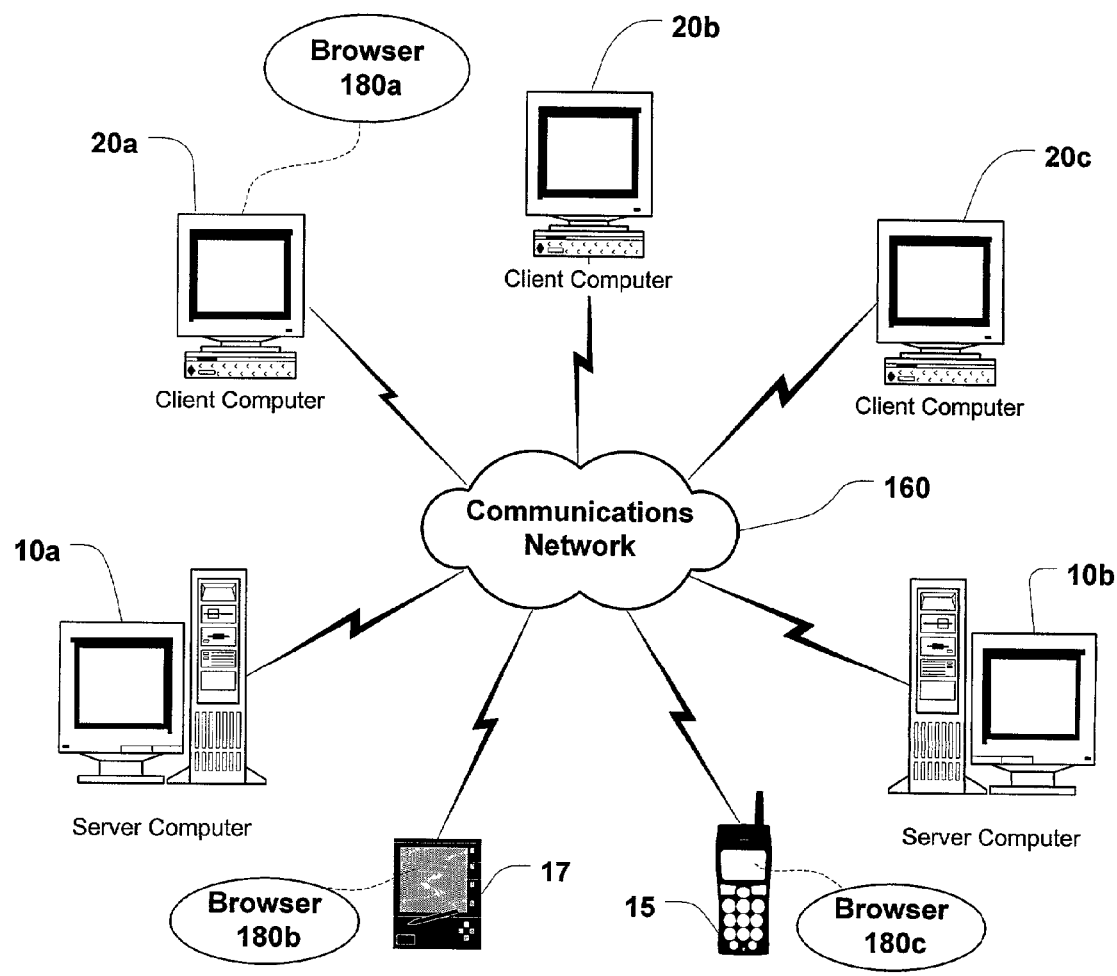
FIG. 2 is a block diagram representing an exemplary network environment having computing elements in accordance with the present invention.

As noted, the computer described above can be deployed as part of a computer network. In general, the above description applies to both server computers and client computers deployed in a network environment. FIG. 2 illustrates an exemplary network environment, with a server in communication with client computers via a network, in which the present invention may be employed. As shown in FIG. 2, a number of servers 10a, 10b, etc., are interconnected via a communications network 160 (which may be a LAN, WAN, intranet or the Internet) with a number of client computers 20a, 20b, 20c, or computing devices, such as, mobile phone 15 and personal digital assistant 17. In a network environment in which the communications network 160 is the Internet, for example, the servers 10 can be Web servers with which the clients 20 communicate via any of a number of known protocols, such as, hypertext transfer protocol (HTTP) or wireless application protocol (WAP). Each client computer 20 can be equipped with browser 180a to gain access to the servers 10. Similarly, personal digital assistant 17 can be equipped with browser 180b and mobile phone 15 can be equipped with browser 180c to display and receive various data.

Thus, the present invention can be utilized in a computer network environment having client computing devices for accessing and interacting with the network and a server computer for interacting with client computers. However, the systems and methods for providing the electronic registration and maintenance of business directory listings and advertisements of the present invention can be implemented with a variety of network-based architectures, and thus should not be limited to the example shown. The present invention will now be described in more detail with reference to a presently illustrative implementation.

Content Usage Experiment Systems and Methods

Figure 3:
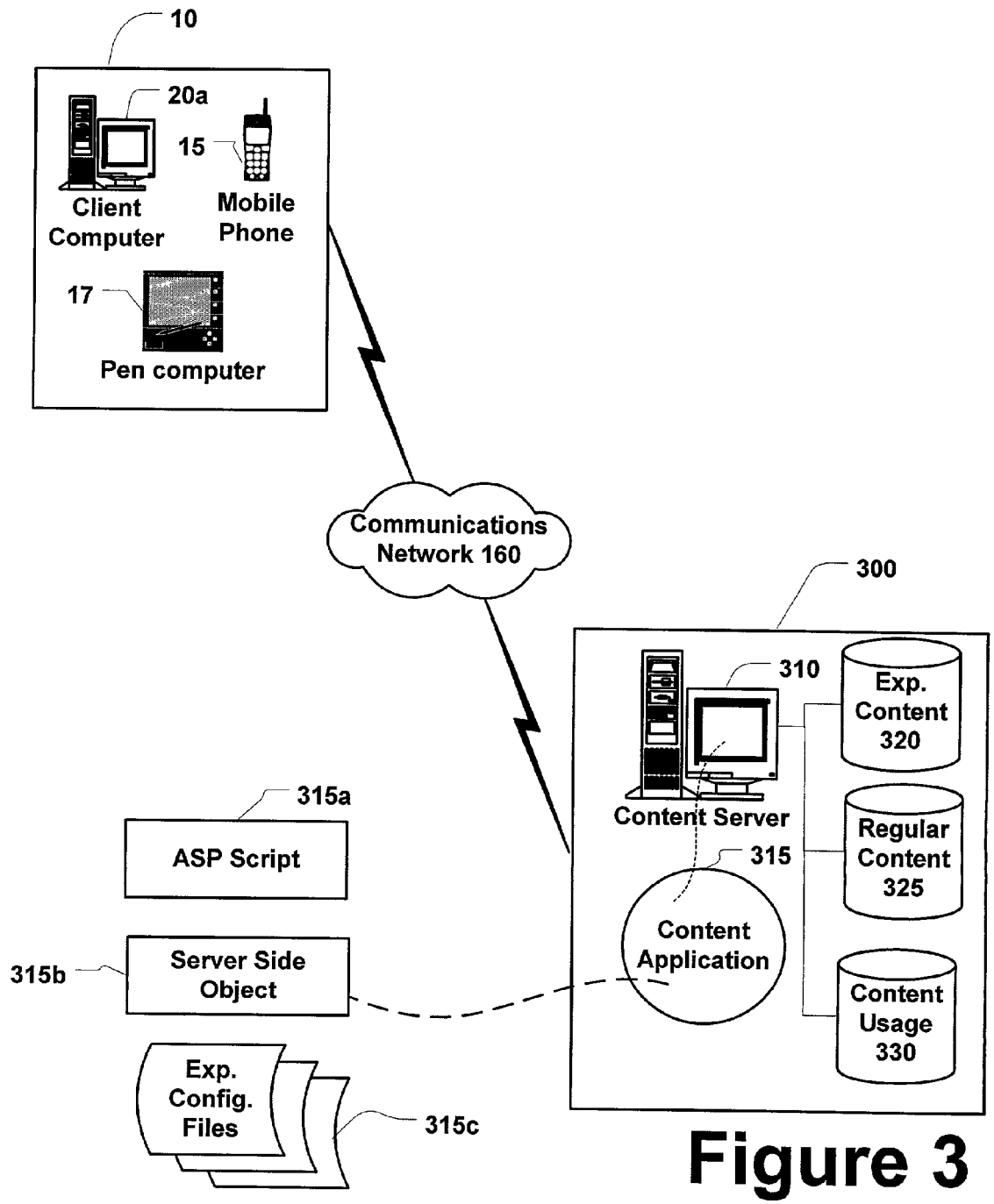
FIG. 3 is a block diagram of the interaction between client computing devices and server computing devices when communicating content during a usage experiment in accordance with the present invention.

FIG. 3 shows content usage experiment system 300 comprising content server 310, content application 315, experiment content store 320, regular content store 325, and content usage store 330. Content application 315 may further comprise ASP script 315a, server side object 315b, and experiment configuration files 315c. Experiment configuration files store a variety of parameters that define each of the experiments desired for execution by the content providers. These parameters may include, the name of the experiment, the duration of the experiment, content sites that are to be included in the experiment (i.e. an Internet service, such as MSN.COM, may have associated with it a number of content sites, such as, MSN.CO.JP, MSN.CO.UK, etc.), the hash divisor, and the integer range for qualified test subjects. Furthermore, as shown in FIG. 3, users group 10 may comprise a variety of computing devices, such as, client computer 10a, mobile phone 15, or personal digital assistant 17.

In operation, a member of requesting computing devices group 10, such as, client computer 10a, mobile phone 15, or personal digital assistant 17, may transmit a request for content to content system 305 over communications network 160. In turn, content application 315 operating on content server 310 may process the request to determine if the requesting user is to be included in any of the active content usage experiments. Content application 315 utilizes ASP script 315a, server side object 31b, and experiment configuration files 315c to determine whether the requester is to be offered experiment content from experiment content data store 320 or regular content from regular content data store 325. The content usage of either content is then tracked by content application and stored on content usage store 330.

In an illustrative implementation, when a request for content is received by content application 325, content application executes ASP script 315a which calls upon side object 315b to process the request. Included in the request for content is a unique identification tag (e.g. GUID) used to identify the client computing device (e.g. client computer 10) that is making the content request. Content application 315a passes the unique identification tag to server side object 315b to determine if the client computing device is to receive experiment data from any of the active content usage experiments. The processing performed by server side object includes the execution of a hashing function that employs the experiment configuration parameter, hash divisor. The use of the hashing function ensures a consistent random sample across multiple content requests and subsequent content usage. In the implementation described, the GUID is random and the hash divisor is used to slot the GUID into either a test or control bucket. A GUID may be slotted into the same bucket for the entire duration of the experiment. As such, this ensures a consistent user experience and allows for easier analysis of collected content usage information.

The hashing function produces an integer which is compared by server side object 315b with the test subject range parameter of experiment configuration files 315c. If the integer falls within any of the experiment test subject ranges of experiment configuration files 315c, experiment content associated with the determined range from experiment content data store 320 is communicated by content application 315 to the requesting client computing device over communications network 160. If the alternative proves to be true, i.e. the calculated integer is not within any defined test subject ranges, regular content from regular content data store 325 is communicated by content application 315 to the requesting client computing device over communications network 160. The content usage of the offered content is tracked and stored by content application 315 on content usage store 330. The content usage information is analyzed to determine the efficacy of the experiment content compared to the efficacy of regular content.

In a preferred implementation, the content usage experiment system 305 is incorporated as part of the MSN.COM Internet site. In this implementation, content server 310 provides MSN.COM or MSN.COM related content. Further, content application 315 comprises a Web daemon that supports and executes ASP scripts, and server side objects. In addition, experiment configuration files 315c are XML-type files that are adaptable and updateable to accommodate content usage experiment changes.

Figure 4:
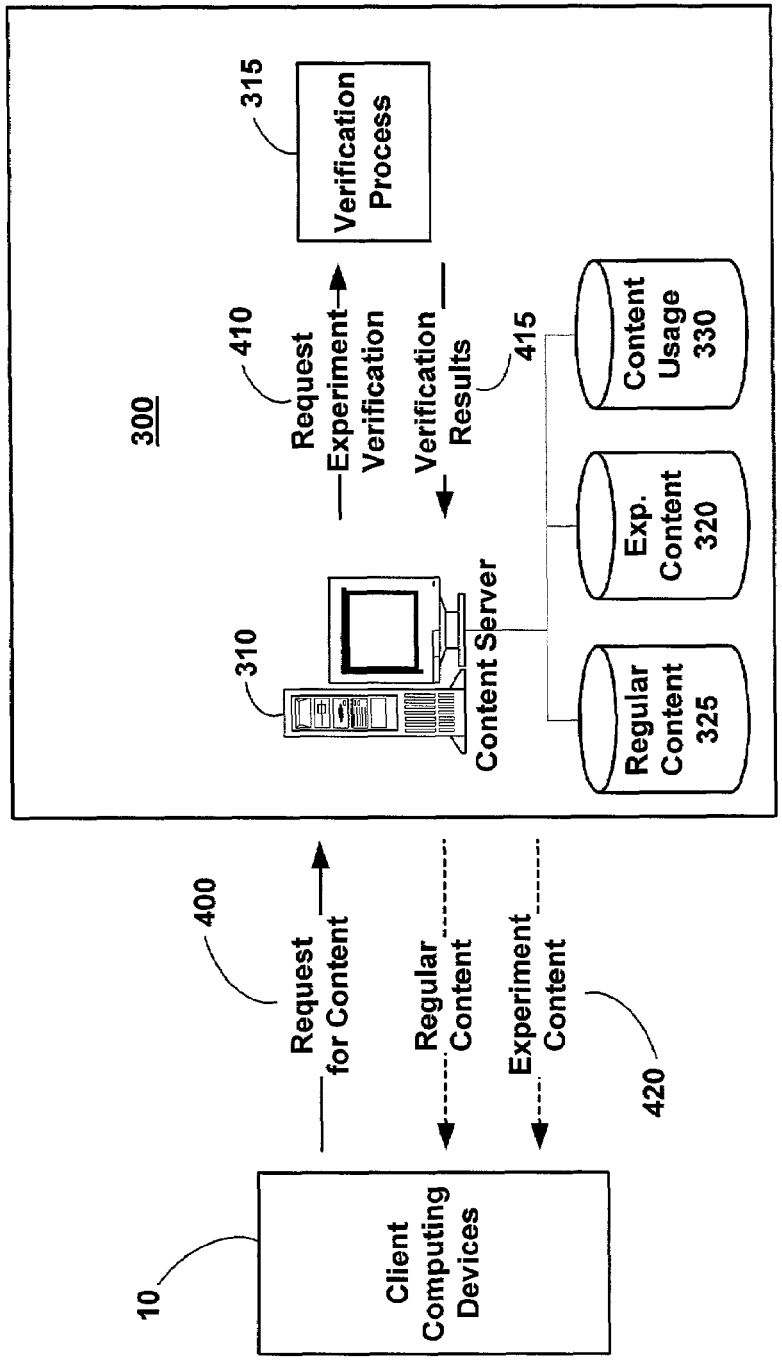
FIG. 4 is a block diagram showing the data flow of cooperating network components when executing a content usage experiment.

FIG. 4 shows the interaction between the cooperating components of content usage experiment system 300 of FIG. 3. As shown, client computing devices 10 may send a request for content 400 to content usage experiment system 300. In response, content server 310 of content usage experiment system 300 processes the request and initiates verification process 315 to determine if client computing devices are to receive experiment content from experiment content store 320 or, alternatively, receive regular content from regular content store 325. Content server 310 initiates verification process 315 (i.e. computing application 315 of FIG. 3) by requesting experiment verification 410. Verification process 315, processes the experiment verification request and provides verification results 415 to content server 310. Depending on the verification results received, content server 310 provides experiment content or regular content 420 to client computing device. Upon providing either the regular content or experiment content 420, content server 310 tracks the usage of this content by client computing device 10 and stores the content usage information in a content usage store 330.

Figure 5:
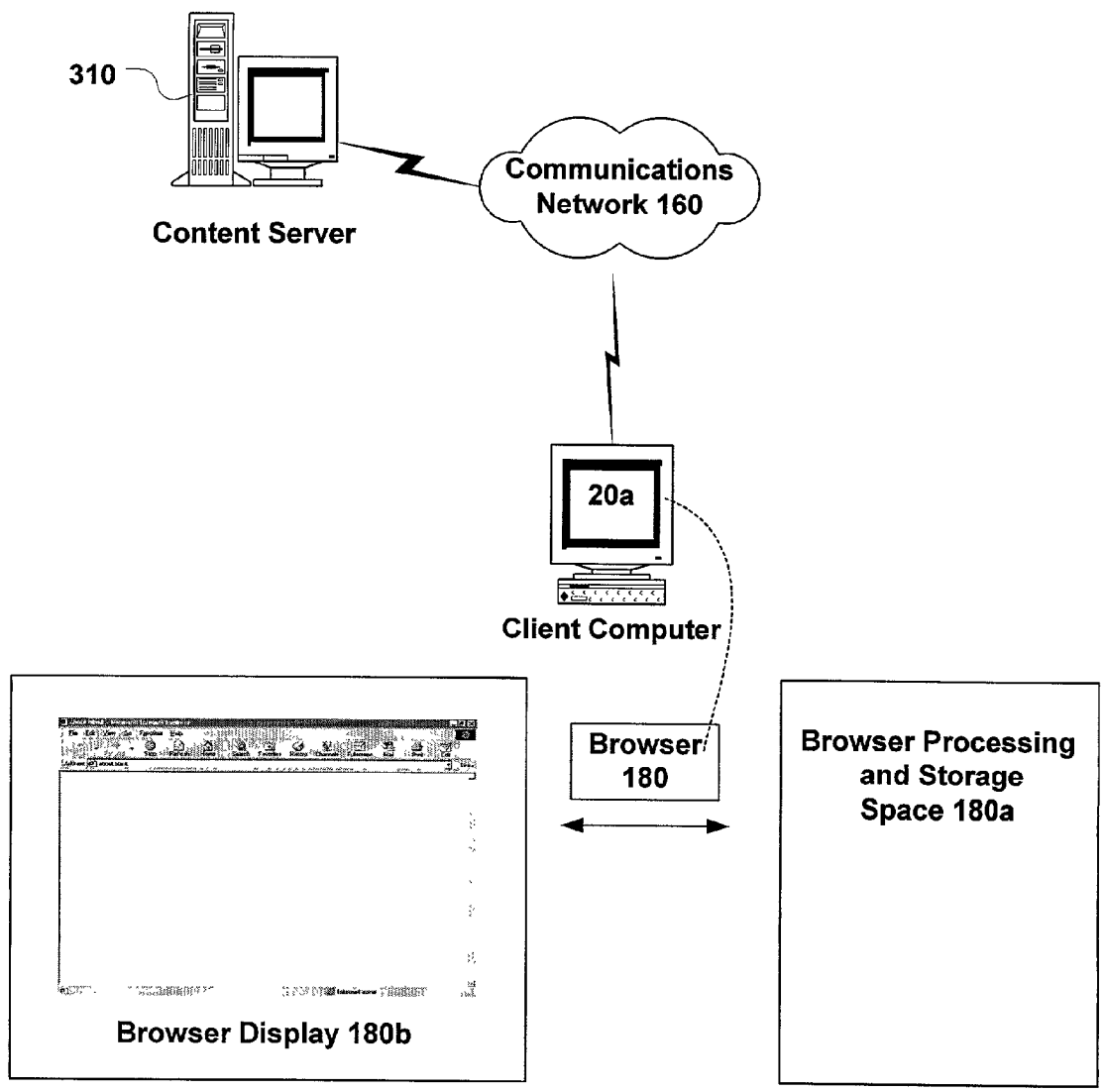
FIG. 5 is a block diagram of an exemplary computing application that processes and displays content in accordance with the present invention.

FIG. 5 shows an exemplary computing application running on client computer 20a that allows a participating content user to interact with content usage experiment system 300 of FIG. 3. As shown, client computer 20a may communicate information to and from content server 310 (of FIG. 3) over communications network 160. This information may be transmitted and displayed through browser 180. Browser 180 comprises browser processing and storage space 180a and browser display area 180b. In operation, content may be communicated to client computer 20a for processing and display to a participating user (not shown) from content server 310 through communications network 160. The data may be processed by browser 180 in browser processing and storage space 180a and displayed in browser display 180b to a participating user (not shown). Content usage experiment system 300 of FIG. 3 may utilize browser 180 to display communicate experiment content and regular content to participating users. Further, content usage experiment system 300 may cooperate with browser 180 to track and store content usage for offered experiment and non-experiment (i.e. regular) content.

Figure 6:
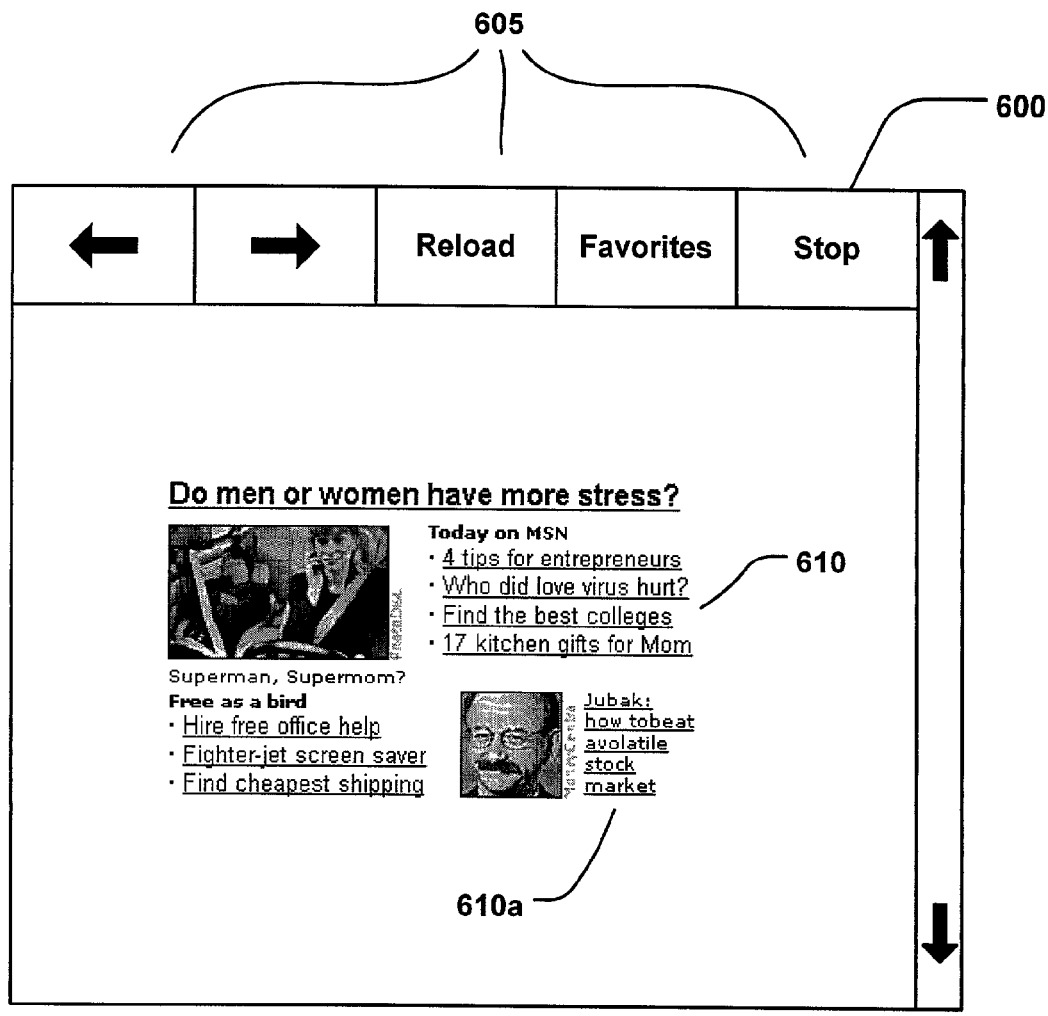
FIG. 6 is a screen shot of exemplary computing application offering regular content in accordance with the present invention.
Figure 6A:
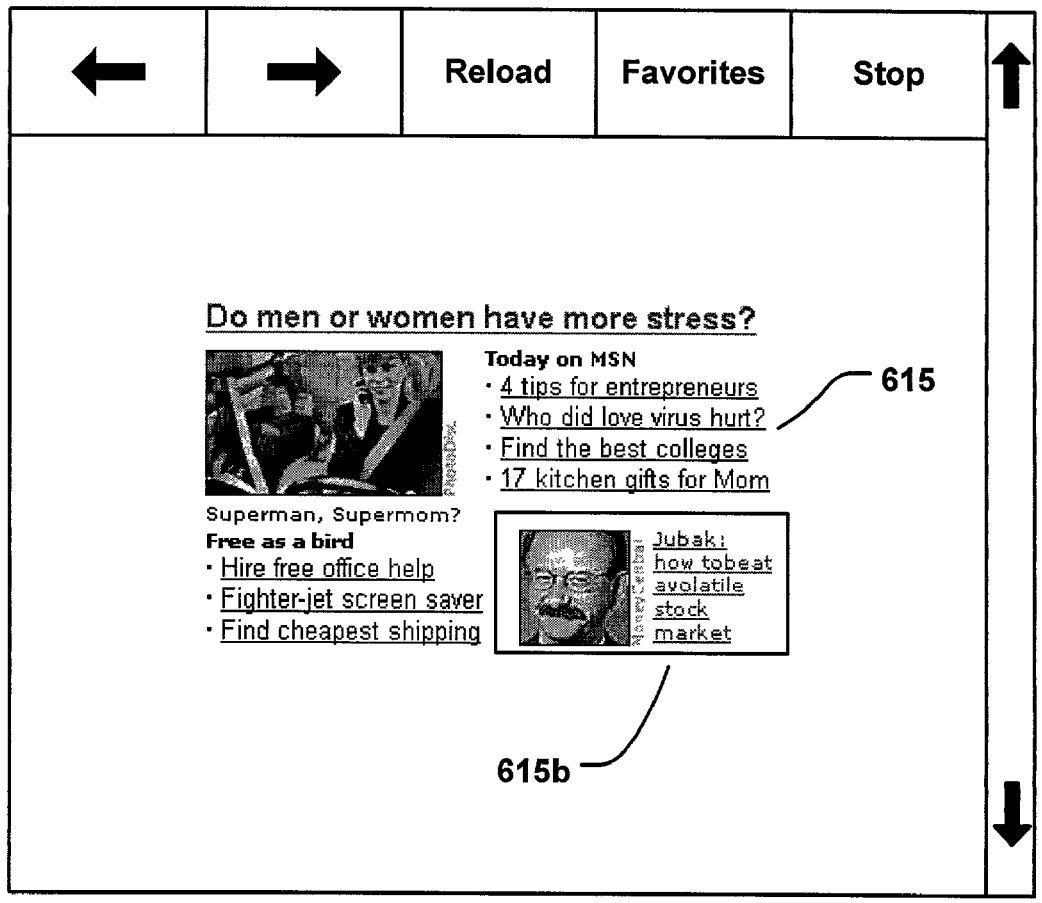
FIG. 6A is a screen shot of the exemplary computing application offering experiment content in accordance with the present invention.

FIGS. 6 and 6A shows screen shots of exemplary computing application 180 of FIG. 5 processing and displaying data in accordance with content usage experiment system 300 of FIG. 3. In an illustrative implementation, content providers may offer experiment and non-experiment content to determine the efficacy of particular content as part of content usage experiments. For discussion purposes, FIG. 6 provides exemplary non-experiment content and FIG. 6A provides experiment content. As shown in FIG. 6, computing application 180 may be displayed as application pane 600 offering a cooperating user (not shown) various controls to navigate and manipulate content 610. In the implementation illustrated, content 610, for discussion purposes, may contain exemplary non-experiment and experiment content. Content 610 comprises a news-type content page providing participating users a variety of news information. As part of news content 610, therein exists specific non-experiment content 610a. As shown, specific non-experiment content 610a comprises a link with graphic to an article relating to the stock market.

FIG. 6A shows a screen shot of content 610 comprising specific experiment content 610b. Experiment content 615b is similar to non-experiment content 610a except a border has been added to highlight specific experiment content 610b. Content providers can track the usage of the non-experiment content 615a and experiment content 615b to determine if the border of experiment content 615b had any impact on content usage. It is understood that non-experiment content 615a and experiment content 615b are provide as examples and that this invention should not be limited to these examples as it contemplates the execution of experiments on various content configurations, presentations, and formats.

Figure 7:
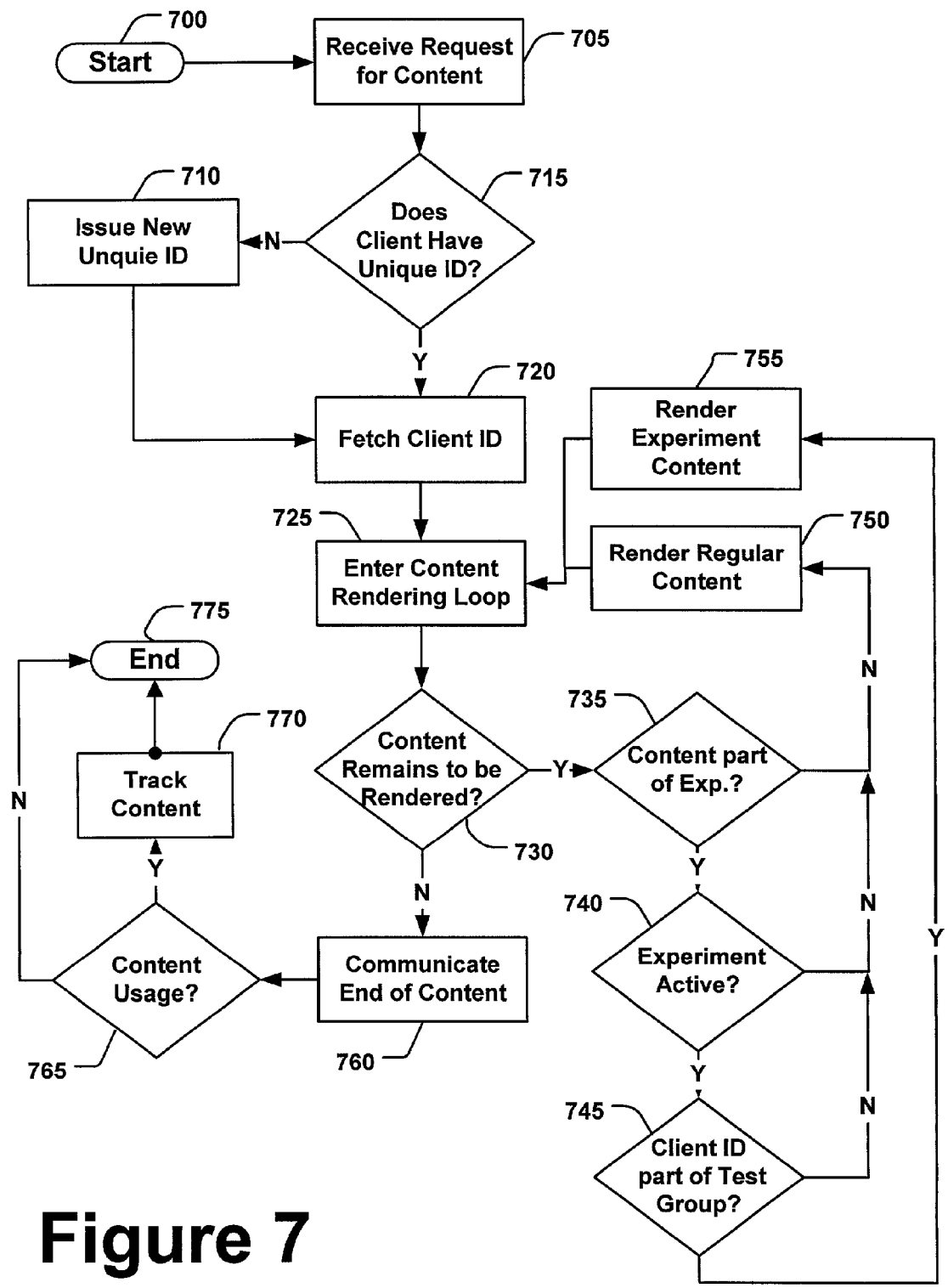
FIG. 7 is a flow diagram of the processing performed by the experiment system when conducting content usage experiments in accordance with the present invention.
Figure 8:
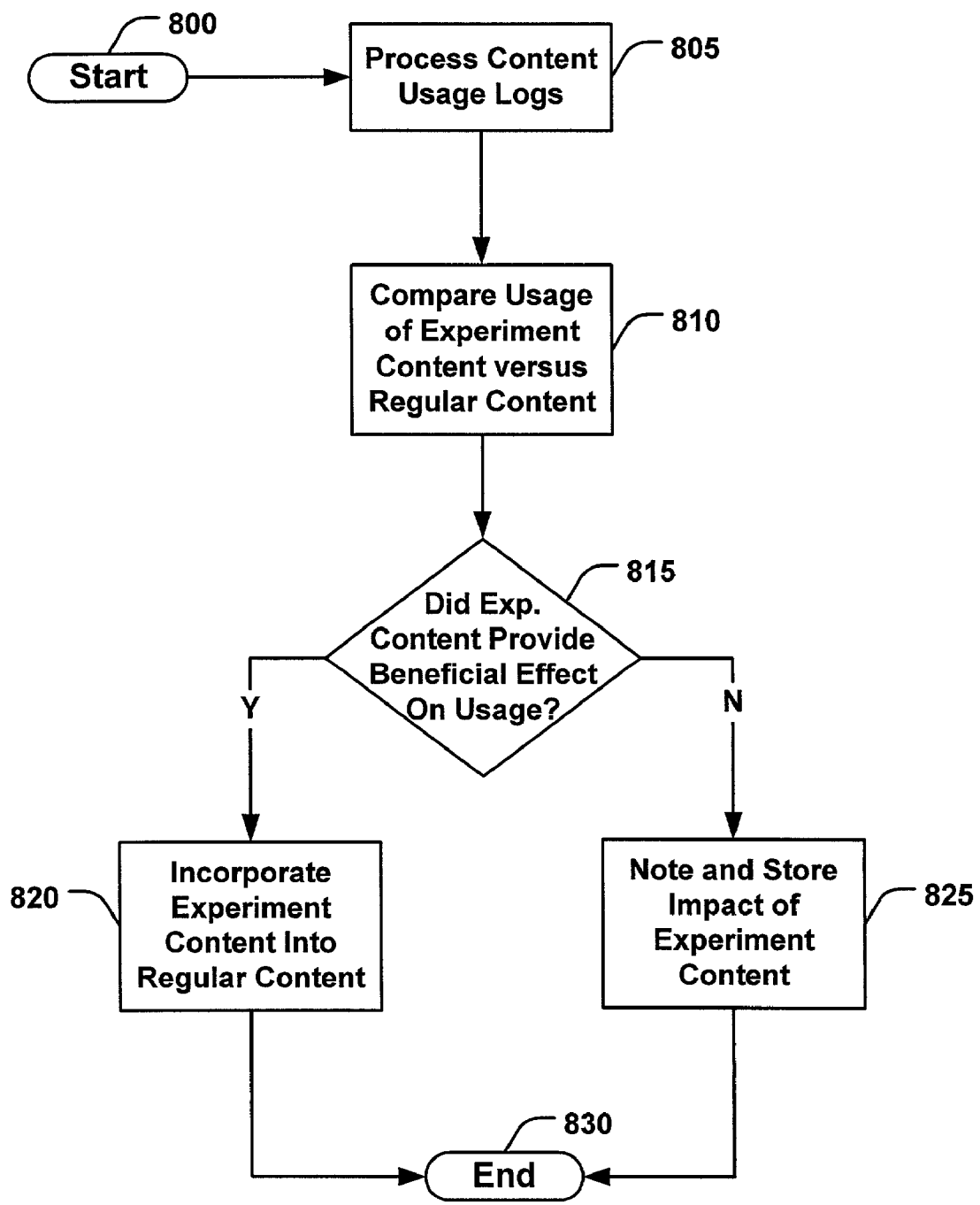
FIG. 8 is a flow diagram of the processing performed to exploit the results of content usage experiments in accordance with the present invention.

FIGS. 7 and 8 describe the processing performed by the content usage experiment system 300 of FIG. 3 to create, manage, and analyze a plurality of live content usage experiments. FIG. 7 describes the overall processing contemplated by content usage experiment system 300. Processing starts at block 700 and proceeds to block 705 where a request is received for content from a participating user by the content server. In a preferred implementation, the request comprises a HTTP header that comprises information about the requesting participating user. Such information may comprise a unique identification tag (e.g. GUID) that is used to identify the client computing device to the content server. Processing then proceeds to block 710 where a check is performed to determine if the participating user's client computing device has an associated unique identification tag. If the client computing device does not have a unique identification tag associated with the participating user's client computing device, processing proceeds to block 715 where the content usage system issues a new unique identification tag to the participating user's client computing device requesting content. Processing then proceeds to block 720 and therefrom. However, if the check performed at block 710 proves that the participating user's client computing device already has a unique identification tag, processing proceeds to block 720 where the client computing device's identification tag is fetched. The system then enters a content rendering loop at block 725. A check is performed at block 730 to determine if any content remains to be rendered. If there is content, processing proceeds to block 735 where check is performed to determine if the requested content that remains to be rendered is part of a created experiment. If the content is part of an experiment processing proceeds to block 740 where a check is performed to determine if the experiment for the requested content is still active. If the experiment is active processing then proceeds to block 745 where a check is performed to determine if the participating user's unique identification is part of the range of users configured for the ongoing experiment having the requested content. If the user is determined to be part of the experiment, experiment content is rendered to the participating user at block 755. Processing then proceeds to block 725 and therefrom.

Alternatively, if the check at block 735 proves that the requested content is not part of any experiment processing proceeds to block 750 where regular non-experiment content is rendered to the participating user. Processing then proceeds to block 725 and therefrom. Similarly, if the check at block 740 proves the experiment to which the requested content is associated is no longer active, processing proceeds to block 750 and therefrom. A similar occurrence takes place if the check at block 745 proves that the participating user is not within the experiment's parameters, processing proceeds to block 750 and therefrom.

If at block 730, the check to determine if content remains to be rendered yields that there is no additional content, the content is communicated to the client computing device at block 760. A check is then performed to determine if there was content usage at block 765. If there is content usage, content usage information is tracked and stored at block 770 before processing terminates at block 775.

FIG. 8 describes the processing performed to exploit results of content usage experiments by the content usage experiment system of the present invention. Processing starts at block 800 and proceeds to block 805 where content usage logs (i.e. files stored on content usage store 330 of FIG. 3) are processed. A comparison is then performed of the usage of the experiment content to the usage of the regular content at block 810. A check is then performed at block 815 to determine if the experiment content drastically affected content usage. If the experiment content significantly impacted content usage, the experiment content is incorporated into the regular content at block 820. The checks performed at blocks 810 and 815 may be realized through a computing application executing on content server 310 of FIG. 3 that compares various aspects of content usage data, such as, the number of hits (i.e. the number of times specific content was interacted with by client computing devices), the frequency of hits, and the time/date of the hits. Processing then terminates at block 830. However, if the check at block 815 results in a finding that it is inconclusive how the experiment content affected content usage, the impact of the experiment content is noted and stored at block 825 for future reference. Processing then terminates at block 830.

In sum, the present invention provides a system and process for providing systems and methods for that allow content providers to efficiently execute a plurality of live parallel Internet content usage experiments that use a large pool of randomly selected participating users (separated into control and test groups) and minimally disturbs the flow of offered content. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner. Further, the storage elements of the exemplary computing applications may be relational or sequential (flat file) type computing databases that are capable of storing data in various combinations and configurations.

Although exemplary embodiments of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention construed in breadth and scope in accordance with the appended claims.

What is claimed is:

1. A method of executing a plurality of live content usage experiments comprising the acts of:
providing a unique identification tag to a content requesting client computing device by a content server;
processing said unique identification tag upon receiving a request for content from said client computing device by said content server to verify if said client computing device is a test subject;
offering experiment content to said client computing device if said client computing device is verified as a test subject;
tracking content usage at said content server of experiment content and non-experiment content offered to said client computing device to produce content usage data; and
analyzing said content usage data to compare usage of experiment content versus non-experiment content to determine if experiment content was used more often than non-experiment content.

2. The method recited in claim 1, wherein said act of providing unique identification tag further comprises the acts of determining if said requesting client computing device has a unique identification tag and assigning a new unique identification tag to said client computing device if said client computing device does not have a unique identification tag.

3. The method recited in claim 2, wherein said determining act comprises processing COOKIES that are part of HTTP headers communicated as part of requests for content by said client computing devices.

4. The method recited in claim 1, wherein said processing step further comprises the acts of performing a hashing function on said received unique identification tags to produce an integer and comparing said integer with a predefined range to verify if said requesting client computing device is a test subject.

5. The method recited in claim 1, further comprising the act of incorporating said analyzed experiment content into non-experiment content if said data indicates said analyzed experiment content was more often used.

6. The method recited in claim 1, wherein said providing, processing, and offering acts are performed by a content application operating on said content server communicating with said client computing devices, said content application cooperating with at least one configuration file having pre-defined content usage experiment parameters and at least one server side object that performs the verification of test subjects.

7. The method recited in claim 6, wherein said communicating act is realized through a communications network comprising any of a fixed-wire LAN, a wireless LAN, a fixed-wire WAN, a wireless WAN, a fixed-wire intranet, a wireless intranet, and the Internet.

8. A computer-readable medium bearing computer-readable instructions for instructing a computer to carry out the acts recited in claim 1.

9. A method to execute live content usage experiments comprising the acts of:
requesting content by at least one client computing device, said at least one client computing device cooperating with a content server over a communications network;
receiving content by said at least one client computing device from said content server, said content being experiment content if said at least one client computing device has a unique identification tag and is verified by said content server using the unique identification tag as a test subject;
tracking content usage for said received content by said at least one computing device; and
communicating said content usage information by said at least one client computing device to said content server, wherein said content usage information is analyzed by said content server to determine the efficacy of experiment content.

10. The method recited in claim 9, wherein said requesting act comprises sending a request by said at least one client computing device to said content server, said request comprising a header having data indicative of said client computing device.

11. The method recited in claim 10, wherein said sending act comprises attaching COOKIES to said request, said COOKIES comprising a unique identification tag that may be used by said content server to verify if said at least one client computing device is a test subject.

12. The method recited in claim 9, wherein said requesting and receiving acts are performed by a computing application operating on said at least one client computing device, said computing application having an interface to procure requests for content and to display received content.

13. A computer-readable medium bearing computer-readable instructions for instructing a computer to carry out the acts recited in claim 9.

14. A system for executing a plurality of live content usage experiments comprising:
 a content usage experiment system, said content usage experiment system comprising experiment configuration data having at least one experiment parameter, a content server that performs test subject verification processes using said at least one experiment parameter from said experiment configuration data, and content data stores; and
 a communications network, to communicate said content by said content usage experiment system to cooperating client computing devices,
 wherein said content usage experiment system receives a request for content from a client computing device, processes said request for content to determine if said client computing device has an assigned unique identification tag, and executes an application to perform said test subject verification processes using said unique identification tag to determine if said client computing device is to be a test subject,
 wherein said content usage experiment system tracks usage of experiment content, and analyzes usage of the experiment content to determine the efficacy of the experiment content.

15. The system recited in claim 14, wherein said computing application comprises a server side object that receives said unique identification tag of said client computing device as input and performs a hashing function to produce an integer, said server side object comparing said integer to a pre-defined range to determine if said client computing device is to be a test subject.

16. The system recited in claim 15, wherein said server side object uses a hash divisor to perform said hashing function.

17. The system recited in claim 15, wherein said experiment content is communicated by said content usage experiment system to said client computing device that is determined to be said test subject.

18. The system recited in claim 17, wherein said experiment content is only communicated by said content usage experiment system to said client computing device if the experiment to which the experiment content is associated has not expired.

19. The system recited in claim 14, wherein said communications network comprises any of a fixed-wire LAN, a wireless LAN, a fixed-wire WAN, a wireless WAN, a fixed-wire intranet, a wireless intranet, and the Internet.

20. The system recited in claim 14, wherein said content stores comprise an experiment content store, a non-experiment content store, and a content usage data store.

21. In a computer network environment a content usage experiment system comprising:
 a content server, said content server in communication with a client computing device over a communications network, said content server receiving requests for content from said client computing device, said client computing device having either been previously assigned a unique identification tag or requiring a unique identification tag; and
 a computing application executing on said content server, said computing application comprising a server object that accepts as input said unique identification tag and processes said unique identification tag with a hashing algorithm to produce an integer, said server side object comparing the calculated integer with a range for pre-defined test subjects to determine if said client computing device is to be a test subject, said computing application communicating experiment content from a cooperating experiment content data store to said client computing device if said client computing device is determined to be a test subject over said communications network and communicating non-experiment content from a non-experiment data store to said client computing device if determined not be a test subject over said communications network,
 wherein content usage data is tracked and stored by said content application for said communicated experiment content and non-experiment content in a cooperating content usage data store, said computing application performing an analysis of said content usage data to determine the efficacy of said communicated experiment content as compared to said non-experiment content.

22. The system recited in claim 21, wherein said analysis employs usage variables comprising the number of time specific experiment and/or non-experiment content was interacted with by client computing devices, the number of unique client computing devices interacting with specific experiment and/or non-experiment content, the time/date of interaction by client computing devices, and the pattern of interaction with experiment and/or non-experiment specific content.

* * * * *